United States Patent [19]

Taute et al.

[11] 4,225,151
[45] Sep. 30, 1980

[54] TRACTOR WITH LARGE CASTER ANGLE TO IMPROVE STEERING CLEARANCE

[75] Inventors: Mark A. Taute, Waterloo; Richard Treichel, Cedar Falls; Jeffrey C. Marks; Timothy J. Mattson, both of Waterloo, all of Iowa

[73] Assignee: Deere & Company, Moline, Ill.

[21] Appl. No.: 925,335

[22] Filed: Jul. 17, 1978

[51] Int. Cl.³ .............................. B62D 17/00
[52] U.S. Cl. ........................ 280/661; 280/111
[58] Field of Search ............... 280/98, 111, 126, 129, 280/661, 675, 94, 95 A, 95 R, 96.1

[56] References Cited

U.S. PATENT DOCUMENTS

| 2,948,546 | 8/1960 | Fabere | 280/95 |
|---|---|---|---|
| 3,301,572 | 1/1967 | Tapp | 280/95 R |
| 3,370,670 | 2/1968 | Love | 180/79.2 |
| 3,446,513 | 5/1969 | Weiertz | 280/96.2 |
| 3,479,051 | 11/1969 | Weiss | 280/96.1 |
| 3,783,966 | 1/1974 | Campbell | 280/111 |
| 3,981,513 | 9/1976 | Erskine | 280/95 R |

FOREIGN PATENT DOCUMENTS

| 1367602 | 6/1963 | France | 280/95 |
|---|---|---|---|
| 529681 | 7/1931 | Fed. Rep. of Germany | 280/95 |
| 780657 | 8/1957 | United Kingdom | 280/95 |

*Primary Examiner*—John J. Love
*Assistant Examiner*—John A. Carroll

[57] ABSTRACT

An agricultural tractor with over-size front tires for use with a mechanical front wheel drive is provided with large caster angle front wheels to allow a front wheel to tuck under the tractor to achieve small radius turns.

36 Claims, 3 Drawing Figures

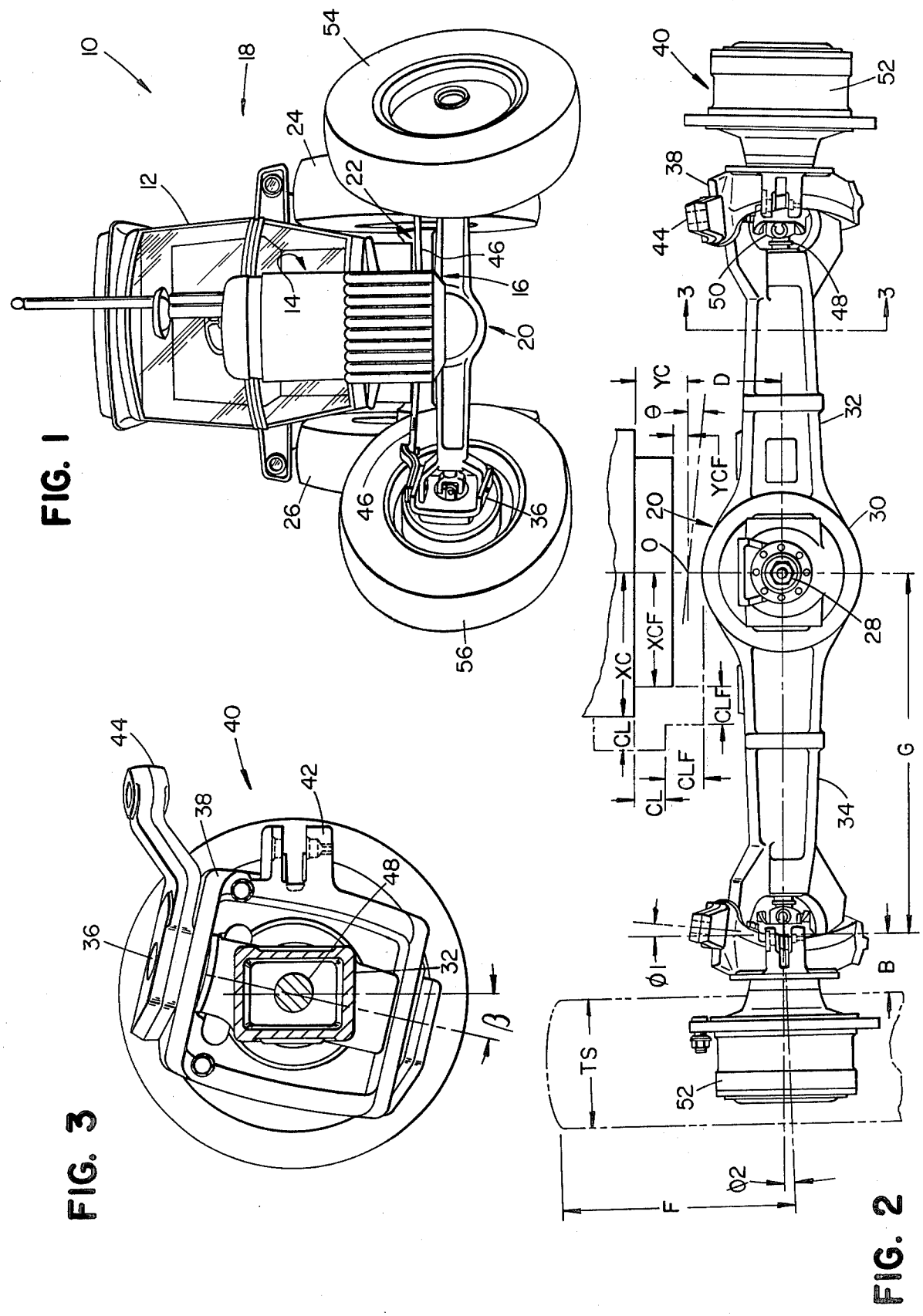

1

TRACTOR WITH LARGE CASTER ANGLE TO IMPROVE STEERING CLEARANCE

BACKGROUND OF THE INVENTION

The present invention relates generally to steering on tractors and more particularly to achieving a small turning radius on an axle oscillatable tractor with oversized tires by greatly increasing the caster angle.

In the past, the practice was to use hydrostatic drive motors on the front wheels of tractors in combination with small tires steerable at large turning angles to make small radius turns. These hydrostatic front wheel drives are subject to spinout and are tractively inefficient.

In order to overcome the above deficiencies, agricultural manufacturers have become interested in mechanical front wheel drives which are less subject to these deficiencies. Based on European experience, it has been found that the front wheel tires must be approximately 30% larger while the preferred tread setting (or distance between tires) is a narrow 1,600 millimeters.

After experimentation with the larger tires and the preferred tread settings, it was determined that conventional steering provided excessively large turning radii because the inside turn wheel tends to interfere with the side of the tractor.

In order to reduce the turning radius of a mechanical front wheel drive tractor to that comparable with a conventional hydrostatic front wheel drive tractor, the steering geometry was analyzed and varied to determine the effect of such variables as axle length, axle pivot offset, kingpin angle, camber angle, oscillation angle, and turning angle.

After extensive analysis and computer simulation, it was determined that by increasing the caster angle to angles not heretofore used in any vehicle, that it was possible to reduce the turning radius of the tractor by causing the wheel to lie down and tuck underneath the body of the tractor.

In the past, as is well known to those skilled in the art, it was undesirable to exceed approximately 5° caster angle because the steering force required to turn the wheels increases drastically with increased caster angle with no improvement in any other operating characteristic. However, analysis and experimental construction has shown that it is possible to have positive caster angles in the range of 11° to 30° which will allow the achieving of small turning radii without interference of the oversize wheels with the tractor body.

SUMMARY OF THE INVENTION

The present invention provides an improvement in tractors which allows tractors to make small radius turns with large diameter tires by providing large caster angles which cause the tires to lie down and tuck underneath the tractor on small radius turns.

The above and additional advantages of the present invention will become apparent to those skilled in the art from a reading of the following detailed description when taken in conjunction with the accompanying drawings.

BRIEF DESCRIPTION OF THE DRAWINGS

FIG. 1 is a front view of a tractor incorporating the present invention shown in operative position;

FIG. 2 is a rear view of a mechanical front wheel drive axle of the tractor of FIG. 1 which incorporates the present invention; and FIG. 3 is a side view partially in section taken along the line 3—3 of FIG. 2 which shows the present invention.

DESCRIPTION OF THE PREFERRED EMBODIMENT

Referring now to FIG. 1, therein is shown a front view of an agricultural tractor 10 making a sharp, small radius right hand turn (as seen by an operator sitting in a tractor cab 12). The tractor or off-road vehicle 10 has a fore and aft extending body which for purposes of the present invention include a grill screen 14 and a side frame 16 which are part of a tractor body 18.

The tractor body 18 is carried by a transversely extending front axle 20 and a transversely extending rear axle 22. The rear axle 22 carries the main left and right drive wheels 24 and 26, respectively.

Referring now to FIG. 2, therein is shown the front axle 20 as seen from the aft end. The front axle 20 includes an input driveshaft 28 into a front differential housing 30. Extending from the front differential housing 30 are left and right axle housings 32 and 34. For purposes of simplicity, tthe remainder of the description of the front axle 20 will refer to the right side although it will be evident that comparable parts exist on the left side.

The axle housing 32 carries a two-part king pin 36 which may best be seen by reference to FIG. 3. The king pin 36 is pivotally connected to a knuckle housing 38 which is part of a wheel assembly 40. The knuckle housing 38 includes a mounting clevis 42 for a steering assist cylinder (hidden behind the front axle 20 in FIG. 1) which turns the entire steerable wheel assembly 40. The knuckle housing 38 further carries a tie rod arm 44 which is connected to the tractor 10 by tie rods 46 shown in FIG. 1.

Referring back to FIG. 2, the wheel assembly 40 is part of a mechanical front wheel drive and is connected to a driveshaft 48 from the front differential housing 30. The driveshaft 48 is connected to a universal joint 50 which connects the driveshaft 48 to a planetary gear set (not shown) in a wheel hub 52. There are two wheel hubs 52 to which the left and right tires 54 and 56 are mounted.

Referring to FIGS. 2 and 3, therein are shown the various dimensions which define the front axle geometry. The positive caster angle, designated by $\beta$, is the angle which the king pin 36 forms with a vertical line in a plane perpendicular to the front axle 20. The king pin angle, designated by $\Phi_1$, is the angle that the king pin 36 makes with a vertical line in a vertical plane passing through the front axle 20. The camber angle, designated by $\Phi_2$, is the angle which the axis of the wheel hub 52 makes with a horizontal plane passing through the front axis 20. The distance from the king pin 36 to the centerline of the tractor 10 is defined by G which is half of the total axle length and to the inside edge of a tire is defined by B, and the radius from the axis of the wheel hub 52 to the corner of the tire is defined as F. The tire section width is TS.

Other parameters required for the analysis, but not shown since they would be obvious to those skilled in the art, are the turning angle $\alpha$ which is the angle in a horizontal plane traversed by the tires from their straightforward position to their turned position and the tire position increment $\psi$ which is the angle traversed by a given point on a tire corner as it is rotated around the center axis of the wheel hub 52. The distance between front and rear axles, or wheel base, is WB and the outside radius in which the entire tractor 10 may be turned, or the turn radius, is TR.

In the preferred embodiment, the front axle 20 is free to oscillate about an axis of oscillation O which is displaced from the centerline of the input driveshaft 28. The maximum angle of oscillation, designated by $\theta$, represents the maximum permissible oscillation of the front axle 20 from the horizontal position. When an axle housing is below the horizontal, the oscillation angle as to that housing will be understood to be a down oscillating position and conversely the opposite housing will have an up oscillation position. The axis of the tires 54 and 56 is offset from the center of oscillation vertically by a distance designated as D and is generally in line vertically therewith.

With O as the center of the ordinary system used in the axle geometry analysis, it will be seen that the axle length with be G, the horizontal and vertical coordinates of the grill screen 14 will be XC and YC, representively, and the horizontal and vertical coordinates of the side frame 16 will be XCF and YCF, respectively.

Since it is desirable that the tires never actually make contact with the sides of the tractor 10, a clearance envelope is provided which defines the minimum distance permissible between the grill screen 14 and side frame 16 and the left and right tires 54 and 56. For purposes of the analysis, the grill screen 14 and side frame 16 clearance envelopes are defined by CL and CLF, respectively.

In operation, when the tractor 10 is moving straight forward, it resembles a conventional tractor. However, when the tractor 10 must be turned at the minimum turning radius which is defined as the minimum outside radius in which the entire body of the tractor can be turned, it will noticed that the left and right tires 54 and 56 will tilt while turning. In a right hand turn, the inside turn tire or the right tire 56 will tend to lie down and tuck underneath the tractor 10 and the clearance envelopes as shown in FIG. 1. The lower portion of the inside turn tire or wheel tucks under the body while the upper portion leans outwardly. The front of the left tire 54 will tend to lean towards the front of the tractor 10 but will not come into contact with the clearance envelopes thereof because, as obvious to those skilled in the art, the left tire 54 does not have to turn as much as the right tire 56 because it has a longer arc to traverse in order to complete the right turn of the tractor 10. While the tuck under of the right tire 56 will be accentuated if the front axle housing 32 is in its maximum up oscillation position with the right tire 56 lifted as high as possible, the back of the right tire 56 will still not interfere with the clearance envelopes.

In order to determine the optimum caster angle which in the preferred embodiment is 13°, a heuristic approach was utilized in which the clearance envelopes were first defined and then the various parameters of front axle geometry changed to determine how to avoid interference between the envelope defining the tires with the clearance envelopes defining the tractor body 18 while providing a turning radius comparable to conventional tractors with standard size tires. It was only after extensive evaluation that it was determined that caster angles would have a beneficial effect on turning radius.

Although one set of equations could be satisfactory for defining the front end of the tractor 10, two separate equations were used to define the grill screen 14 and the side frame 16 in the preferred embodiment. Additional equations would be required for complex configurations like those involving front end weights or other structures.

For the grill screen 14, the X and Y coordinates were defined by:

$$X < XC + CL$$

$$Y > YC - CL$$

where:
XC = Grill Screen Width ÷ 2
YC = Grill Screen Height above Axis of Oscillation
CL = Desired clearance distance from Grill Screen For the side frame 16, the X and Y coordinates were defined by:

$$X < XCF + CLF$$

$$Y > YCF - CLF$$

where:
XCF = Side frame width ÷ 2
YCF = Side frame height above axis of oscillation
CLF = Desired clearance distance from side frame For the preferred embodiment, it was determined that the tire envelope (or the tire itself without clearance) was defined by:

$$X = G \cos\theta + AB \cos\beta \sin(\phi_1+\theta) + B \sin\phi_3 \cos(\phi_1+\theta) + D \sin\theta - \{(BC \cos\omega - BC \cos(\alpha+\omega))(\cos(\phi_1/\cos\beta) - \{(BC \sin(\alpha+\omega) - BC \sin\omega) \tan\beta + (BC \cos\omega - BC \cos(\alpha+\omega)) \sin(\phi_1/\cos\beta)\} \cos\beta \tan\theta\} \cos\theta + F \cos\psi \sin(\phi_1+\gamma) \cos(\alpha \cos\beta) \cos(\phi_1+\theta) - F \cos\psi \cos(\phi_1+\gamma) \sin(\phi_1+\theta) - F \sin\psi \sin(\alpha \cos\beta) \cos(\phi_1+\theta)$$

$$Y = G \sin\theta + B \sin(\theta-\phi_2) - D \cos\theta - \{(BC \cos\omega - BC \cos(\alpha+\omega)) \cos(\phi_1/\cos\beta) - ((BC \sin(\alpha+\omega) - BC \sin\omega) \tan\beta + (BC \cos\omega - BC \cos(\alpha+\omega)) \sin(\phi_1/\cos\beta)) \cos\beta \tan\phi\} \sin\theta - ((BC \sin(\alpha+\omega) - BC \sin\omega) \tan\beta + (BC \cos\omega - BC \cos(\alpha+\omega)) \sin(\phi_1/\cos\beta)) \cos\beta/\cos\theta + F \cos\psi \sin(\phi_1+\gamma) \cos(\alpha \cos\beta) \sin(\phi_1+\theta) + F \cos\psi \cos(\phi_1+\gamma) \cos(\phi_1+\theta) - F \sin\psi \sin(\alpha \cos\beta) \sin(\phi_1+\theta)$$

where:
B = kin pin to tire inside edge distance
D = oscillation axis offset distance
F = tire axis to tire corner distance
G = distance between king pins ÷ 2
$AB = B \cos\phi_3/\cos\beta$
$BC = B \sin\phi_3/\cos(\arctan AB \sin\beta/B \sin\phi_3)$
$\alpha$ = turning angle
$\beta$ = caster angle $$\gamma = \arcsin\{\frac{B\sin\phi_2 + (BC\sin(\alpha+\omega) - BC\sin\omega)\tan\beta\cos\beta}{B\cos(\alpha\cos\beta)} + \frac{(BC\cos\omega - BC\cos(\alpha+\omega))\sin(\frac{\phi_1}{\cos\beta})\cos\beta}{B\cos(\alpha\cos\beta)}\}$$

$\theta$ = maximum oscillation angle
$\phi_1$ = king pin angle
$\phi_2$ = camber angle
$\phi_3 = 90° - \phi_1 - \phi_2$
$\psi$ = tire position angle ω=arc sin (sin $\phi_2$ sin $\beta$)

Since undesirable interference occurs when the X and Y coordinates of the clearance evelopes are equal to those of the tire envelope, the workable caster angles are those with which no interference occurs.

As would be obvious to those skilled in the art, if a tractor has no oscillation or oscillation offset, $\theta$ and D containing components of the above equations would be dropped out. If a tractor has oscillation only, the D containing components would be dropped out.

The caster angles which were a result of the above equations were then tested in an equation in which the turn radius is defined as:

$$TR = \sqrt{WB^2 + (2G + \frac{WB}{\tan\alpha})^2 + \frac{TS}{2}}$$

Where;
WB=wheel base or distance between front and rear axles
G=total axle length÷2
TS=tire section width
$\alpha$=turning angle To be acceptable, the caster angle $\beta$ has to allow a turning angle $\alpha$ which will provide a turn radius TR comparable to the empirically determined minimum turn radius of a conventional tractor of similar configuration with normal size tires and hydrostatic or unpowered front wheels.

Essentially, possible caster angles are first tested to determine the maximum turning angles $\alpha$ possible without interference between the envelopes of the tires and the tractor body. These maximum turning angles are then tested to determine if a turn radius is possible which is comparable to the empirically determined minimum turn radius.

Obviously from the above, a predetermined minimum turn radius can be determined using the empirically determined minimum turn radius. From the predetermined minimum turn radius, a maximum allowable turning angle can be calculated from the above equation to allow the determination of an optimum caster angle for a given configuration by working backwards through the interference equations.

The minimum permissible caster angle $\beta$ is determined by the width of body of the narrowest tractor at a maximum up oscillated position and in practice is about 11°.

With the experimentally determined minimum turn radius of about 9 meters and a conventional body, the optimum caster angle $\beta$ has been determined to be approximately 13°.

The maximum permissible caster angle has generally approximated the minimum permissible caster angle for a tractor because of cosmetic appearances. If too large of a caster angle is used, it visually appears as though the axle is broken and the tire has fallen underneath the tractor. If it were not for the nonfunctional cosmetic appearance, a caster angle in the range of 20° would be satisfactory with the only limitation being that angle, about 30°, at which the tire will be separated from the hub or the hub will be bolts broken by the weight of the tractor 10 pressing on the hub 52 at the maximum down oscillated position.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. An off-road vehicle having a fore and aft extending body with one end carried by a transversely extending axle member having king pin means at opposite ends with each pivotally connected to a wheel assembly having a driven ground engaging steerable wheel spaced laterally outwardly from said fore and aft extending body, means acting on the wheel assembly for steering and turning said vehicle at a predetermined minimum turn radius, the improvement comprising: said king pin means having a predetermined caster angle for tilting the wheels and causing a lower portion of the inside turn wheel to tuck vertically beneath a portion of said fore and aft extending body when said vehicle is turned at the predetermined minimum turn radius.

2. An off-road vehicle having a fore and aft extending body with one end carried by a transverse axle member oscillatable from a horizontal position around a fore and aft extending axis, said transverse axle member having king pin means at opposite ends with each pivotally connected to a wheel assembly having a driven ground engaging steerable wheel spaced laterally outwardly from said fore and aft extending body, means acting on the wheel assembly for steering and turning said vehicle at a predetermined minimum turn radius, the improvement comprising: said king pin means having a predetermined caster angle for tilting the wheels and causing a lower portion of the inside turn wheel to tuck vertically beneath a portion of said fore and aft extending body when said vehicle is turned at the predetermined minimum turn radius with said transverse axle member in a maximum oscillated position.

3. An off-road vehicle having a fore and aft extending body with one end carried by a transverse axle member oscillatable from a horizontal position around a fore and aft extending axis vertically displaced from said transverse axle member, said transverse axle member having king pin means at opposite ends with each pivotally connected to a wheel assembly having a driven ground engaging steerable wheel spaced laterally outwardly from said fore and aft extending body, means acting on the wheel for steering and turning said vehicle at a predetermined minimum turn radius, the improvement comprising: said king pin having a predetermined caster angle for tilting the wheels and causing a lower portion of the inside turn wheel to tuck vertically beneath a portion of said fore and aft extending body when said vehicle is turned at the predetermined minimum turn radius with said transverse axle member in a maximum oscillated position.

4. An off-road vehicle having a fore and aft extending body with one end carried by a transversely extending axle member having king pin means at opposite ends with each pivotally connected to a wheel assembly having a driven ground engaging steerable wheel spaced laterally outwardly from said fore and aft extending body, means acting on the wheel assembly for steering and turning said vehicle at a predetermined minimum turn radius, the improvement comprising: said king pin means having a caster angle in a range from 11° to 30°.

5. The improvement as claimed in claim 4 wherein said caster angle is 13°.

6. The improvement as claimed in claim 4 wherein said caster angle is in a range from 11° to 20°.

7. The improvement as claimed in claim 6 wherein said caster angle is in a range from 13° to 16°.

8. An off-road vehicle having a fore and aft extending body with one end carried by a transverse axle member oscillatable from a horizontal position around a fore and aft extending axis, said transverse axle member having a king pin at opposite ends with each pivotally connected to a wheel assembly having a driven ground engaging steerable wheel spaced laterally outwardly from said fore and aft extending body, means acting on the wheel assembly for steering and turning said vehicle at a predetermined minimum turn radius, the improvement comprising: said king pins having a caster angle in a range from 11° to 30°.

9. The improvement as claimed in claim 8 wherein said caster angle is 13°.

10. The improvement as claimed in claim 8 wherein said caster angle is in a range from 11° to 20°.

11. The improvement as claimed in claim 10 wherein said caster angle is in a range from 13° to 16°.

12. An off-road vehicle having a fore and aft extending body with one end carried by a transverse axle member oscillatable from a horizontal position around a fore and aft extending axis vertically displaced from said transverse axle member, said transverse axle member having a king pin at opposite ends with each pivotally connected to a wheel assembly having a driven ground engaging steerable wheel spaced laterally outwardly from said fore and aft extending body, means acting on the wheel assembly for steering and turning said vehicle at a predetermined minimum turn radius, the improvement comprising: said king pins having a caster angle in a range from 11° to 30°.

13. The improvement as claimed in claim 8 wherein said caster angle is 13°.

14. The improvement as claimed in claim 8 wherein said caster angle is in a range of from 11° to 20°.

15. The improvement as claimed in claim 14 wherein said caster angle is in a range from 13° to 16°.

16. An off-road vehicle having a fore and aft extending body of a predetermined weight with a predetermined clearance envelope therearound with one end of the body carried by a transversely extending axle member having a king pin at opposite ends pivotally connected to one of a pair of steerable wheel assemblies each of which includes a driven ground engaging wheel spaced from the predetermined clearance envelope of said body and mounted on a wheel hub, and means acting on the wheel assembly for steering and turning said vehicle at a predetermined minimum turn radius, the improvement comprising: said king pins having a caster angle in a range from a minimum where one of said steerable wheels coincides with the predetermined clearance envelope while a portion of the one of said steerable wheels is disposed vertically beneath the predetermined clearance envelope when said vehicle is turned at the predetermined minimum turn radius to a maximum just below where the predetermined weight of said body causes the one of said wheels to be dismounted from said wheel hub thereof at the predetermined minimum turn radius, said king pin means tilting the wheels and causing the upper portion of the one of said steerable wheels to lean outwardly from the body at the predetermined minimum turn radius.

17. An off-road vehicle having a fore and aft extending body of a predetermined weight with a predetermined clearance envelope therearound with one end of the body carried by a transversely extending axle member oscillatable from a horizontal position around a fore and aft extending axis, said transverse axle member having a king pin at opposite ends pivotally connected to one of a pair of steerable wheel assemblies each of which includes a driven ground engaging wheel spaced from said predetermined clearance envelope of said body and mounted on a wheel hub, and means acting on the wheel assembly for steering and turning said vehicle within a predetermined minimum turn radius, the improvement comprising: said king pins having a caster angle in a range from a minimum where one of said steerable wheels coincides with said predetermined clearance envelope while a portion of the one of said steerable wheels is disposed vertically beneath said predetermined clearance envelope when said vehicle is turned at the predetermined minimum turn radius with said transverse axle member in a first maximum oscillated position to a maximum just below where the predetermined weight of said body causes the one of said wheels to be dismounted from said wheel hub thereof at the predetermined minimum turn radius with said transverse axle member at a second maximum oscillated position, said king pin means tilting the wheels and causing the upper portion of the one of said steerable wheels to lean outwardly from the body at the predetermined minimum turn radius.

18. An off-road vehicle having a fore and aft extending body of a predetermined weight with a predetermined clearance envelope therearound with one end of the body carried by a transversely extending axle member oscillatable from a horizontal position around a fore and aft extending axis vertically displaced from said transverse axle member, said transverse axle member having a king pin at opposite ends pivotally connected to one of a pair of steerable wheel assemblies each of which includes a driven ground engaging wheel spaced from said predetermined clearance envelope of said body and mounted on a wheel hub, and means acting on the wheel assembly for steering and turning said vehicle at a predetermined minimum turn radius, the improvement comprising: said king pins having a caster angle in a range from a minimum where one of said steerable wheels coincides with said predetermined clearance envelope while a portion of the one of said steerable wheels is disposed vertically beneath said predetermined clearance envelope when said vehicle is turned at the predetermined minimum turn radius with said transverse axle member in a first maximum oscillated position to a maximum just below where the predetermined weight of said body causes the one of said wheels to be dismounted from said wheel hub thereof at the predetermined minimum turn radius with said transverse axle member at a second maximum oscillated position, said king pin means tilting the wheels and causing the upper portion of the one of said steerable wheels to lean outwardly from the body at the predetermined minimum turn radius.

19. A vehicle having a fore and aft extending body carried by a pair of spaced apart transversely extending axle members, one of said axle members carried by a pair of ground-engaging drive wheels and the other of said axle members having king pins at opposite ends pivotally connected to turn a pair of steerable wheel assemblies through a turning angle for turning said vehicle within a predetermined minimum turn radius, said pair of steerable wheel assemblies including a pair of ground-engaging tires having a predetermined tire section width and having a predetermined spacing from said vehicle body, the improvement comprising: said king pins having a caster angle substantially determined by $$TR = \sqrt{WB^2 + (2G + \frac{WB}{\tan\alpha})^2} + \frac{TS}{2}$$

Where
- TR = said predetermined minimum turn radius
- WB = distance between said spaced apart axle memnbers
- G = distance between said king pins ÷ 2
- TS = tire section width
- α = turning angle and by $$XC + CL = G + AB \cos \beta \sin (\phi_1) + B \sin \phi_3 \cos (\phi_1) - \{(BC \cos \omega - BC \cos (\alpha+\omega)) \cos (\phi_1/\cos \beta) + F \cos \psi \sin (\phi_1+\gamma) \cos (\alpha \cos \beta) \cos (\phi_1) - F \cos \psi \cos (\phi_1+\gamma) \sin (\phi_1) - F \sin \psi \sin (\alpha \cos \beta) \cos (\phi_1)$$

$$YC - CL = B \sin (-\phi_2) - ((BC \sin (\alpha+\omega) - BC \sin \omega) \tan \beta + (BC \cos \omega - BC \cos (\alpha+\omega)) \sin (\phi_1/\cos \beta) \cos \beta + F \cos \psi \sin (\phi_1+\gamma) \cos (\alpha \cos \beta) \sin (\phi_1) + F \cos \psi \cos (\phi_1+\gamma) \cos (\phi_1) - F \sin \psi \sin (\alpha \cos \beta) \sin (\phi_1)$$

Where
- XC = vehicle body width ÷ 2
- YC = vehicle body height above said other of said axle members
- CL = desired clearance from vehicle body
- B = king pin to tire inside edge distance
- F = tire axis to tire corner distance
- G = distance between said king pins ÷ 2
- AB = B cos $\phi_3$/cos $\beta$
- BC = B sin $\phi_3$/cos (arc tan AB sin $\beta$/$\beta$ sin $\phi_3$)
- α = turning angle
- β = said caster angle $$\gamma = \arc\sin \frac{B\sin\phi_2 + \{(BC\sin(\alpha + \omega) - BC\sin\omega)\tan\beta\}\cos\beta}{B\cos(\alpha\cos\beta)} + \frac{(BC\cos\omega - BC\cos(\alpha + \omega))\sin(\frac{\phi_1}{\cos\beta})\}\cos\beta}{B\cos(\alpha\cos\beta)}$$

- $\phi_1 \neq$ king pin angle
- $\phi_2$ = camber angle
- $\phi_3 = 90° - \phi_1 - \phi_2$
- $\psi$ = tire position angle
- $\psi$ = arc sin (sin $\phi_2$ sin $\beta$).

20. The improvement as claimed in claim 19 wherein said pair of steerable wheel assemblies are driven with said pair of ground engaging drive wheels.

21. A vehicle having a fore and aft extending body carried by a pair of spaced apart transversely extending axle members, one of said axle members carried by a pair of ground engaging wheels and the other of said axle members is oscillatable around a fore and aft extending axis and has king pins at opposite ends pivotally connected to turn a pair of steerable wheel assemblies through a turning angle for turning said vehicle within a predetermined minimum turn radius, said pair of steerable wheel assemblies including a pair of ground engaging tires having a predetermined tire section width and having a predetermined spacing from said vehicle body, the improvement comprising: said king pins having a caster angle substantially determined by $$TR = \sqrt{WB^2 + (2G + \frac{WB}{\tan\alpha})^2} + \frac{TS}{2}$$

where
- TR = said predetermined minimum turn radius
- WB = distance between said spaced apart axle members
- G = distance between said king pins ÷ 2
- TS = tire section width
- α = turning angle and by $$XC + CL = G \cos \phi + AB \cos \beta \sin (\phi_1+\theta) + B \sin \phi_3 \cos (\phi_1+\theta) - \{(BC \cos \omega - BC \cos (\alpha+\omega)) \cos (\phi_1/\cos \beta) - \{(BC \sin (\alpha+\omega) - BC \sin \omega) \tan \beta + (BC \cos \omega - BC \cos (\alpha+\omega)) \sin (\phi_1/\cos \beta)\} \cos \beta \tan \phi\} \cos \theta + F \cos \psi \sin (\phi_1+\gamma) \cos (\alpha \cos \beta) \cos (\phi_1+\theta) - F \cos \psi \cos (\phi_1+\gamma) \sin (\phi_1+\theta) - F \sin \psi \sin (\alpha \cos \beta) \cos (\phi_1+\theta)$$

$$YC - CL = G \sin \theta + B \sin (\theta - \phi_2) - \{(BC \cos \omega - BC \cos (\alpha+\omega)) \cos (\phi_1/\cos \beta) - ((BC \sin (\alpha+\omega) - BC \sin \omega) \tan \beta + (BC \cos \omega - BC \cos (\alpha+\omega)) \sin (\phi_1/\cos \beta) \cos \beta \tan \theta\} \sin \theta - ((BC \sin (\alpha+\omega) - BC \sin \omega) \tan \beta + (BC \cos \omega - BC \cos (\alpha+\omega)) \sin (\phi_1/\cos \beta)) \cos \beta/\cos \theta + F \cos \psi \sin (\phi_1+\gamma) \cos (\alpha \cos \beta) \sin (\phi_1+\theta) + F \cos \psi \cos (\phi_1+\theta) \cos (\phi_1+\theta) - F \sin \psi \sin (\alpha \cos \beta) \sin (\phi_1+\theta)$$

where
- XC = vehicle width ÷ 2
- YC = vehicle body weight above said other of said axle members
- CL = desired clearance from vehicle body
- B = king pin to tire inside edge distance
- F = tire axis to tire corner distance
- G = distance between said king pins ÷ 2
- AB = B cos $\phi_3$/cos $\beta$
- BC = B sin $\phi_3$/cos (arc tan AB sin $\beta$/sin $\phi_3$)
- α = said turning angle
- β = said caster angle $$\gamma = \arc\sin \{ \frac{B\sin\phi_2 + \{(BC\sin(\alpha + \omega) - BC\sin\omega)\tan\beta\}\cos\beta}{B\cos(\alpha\cos\beta)} + \frac{\{(BC\cos\omega - BC\cos(\alpha + \omega))\sin(\frac{\phi_1}{\cos\beta})\}\cos\beta}{B\cos(\alpha\cos\beta)} \}$$

- $\phi_1$ = king pin angle
- $\phi_2$ = camber angle
- $\phi_3 = 90 - 100_1 - \phi_2$
- $\psi$ = tire position angle
- $\omega$ = arc sin (sin $\phi_2$ sin $\beta$)
- $\theta$ = maximum oscillation angle.

22. The improvement as claimed in claim 21 wherein said pair of steerable wheel assemblies are driven with said pair of ground engaging drive wheels.

23. A vehicle having a fore and aft extending body carried by a pair of spaced apart transversely extending axle members, one of said axle members carried by a pair of ground engaging wheels and the other of said axle members is oscillatable around a fore and aft extending axis and has king pins at opposite ends pivotally connected to turn a pair of steerable wheel assemblies through a turning angle for turning said vehicle within a predetermined minumum turn radius, said pair of steerable wheel assemblies including a pair of ground engaging tires having a predetermined tire section width and having a predetermined spacing from said vehicle body, the improvement comprising: said king pins having a caster angle substantially determined by $$TR = \sqrt{WB^2 + (2G + \frac{WB}{\tan\alpha})^2} + \frac{TS}{2}$$

where
 TR = said predetermined minimum turn radius
 WB = distance between said spaced apart axle members
 G = distance between said king pins ÷ 2
 TS = tire section width
 $\alpha$ = turning angle
and by $XC+CL=G\cos\theta+AB\cos\beta\sin(\phi_1+\theta)+B\sin\phi_3$
$\cos(\phi_1+\theta)+D\sin\theta-\{(BC\cos\omega-BC\cos(\alpha+\omega))\cos(\phi_1/\cos\beta)-\{(BC\sin(\alpha+\omega))-BC\sin\omega)\tan\beta+(BC\cos\omega-BC\cos(\alpha+\omega))\sin\phi_1/\cos\beta\}\cos\beta\tan\theta\}\cos\theta+F\cos\psi\sin(\phi_1+\gamma)\cos(\alpha\cos\beta)\cos(\phi_1+\theta)-F\cos\psi\cos(\phi_1+\gamma)\sin(\phi_1+\phi)-F\sin\psi\sin(\alpha\cos\beta)\cos(\phi_1+\theta)$ $YC-CL=G\sin\theta+B\sin(\theta-\phi_2)-D\cos\theta-\{(BC\cos\omega-BC\cos(\alpha+\omega))\cos(\phi_1/\cos\beta)-((BC\sin(\alpha+\omega)-BC\sin\omega)\tan\beta+(BC\cos\omega-BC\cos(\alpha+\omega))\sin(\phi_1/\cos\beta))\cos\beta\tan\theta\}\sin\theta-((BC\sin(\alpha+\omega)-BC\sin\omega)\tan\beta+(BC\cos\omega-BC\cos(\alpha+\omega))\sin(\phi_1/\cos\beta))\cos\beta/\cos\theta+F\cos\psi\sin(\phi_1+\gamma)\cos(\alpha\cos\beta)\sin(\phi_1+\theta)+F\cos\omega\cos(\phi_1+\gamma)\cos(\phi_1+\theta)-F\sin\psi\sin(\alpha\cos\beta)\sin(\phi_1+\theta)$ where
 XC = vehicle width ÷ 2
 YC = vehicle body height above said other of said axle members
 CL = desired clearance from vehicle body
 B = king pin to tire inside edge distance
 F = tire axis to tire corner distance
 G = distance between said king pins ÷ 2
 AB = B cos $\phi_3$/cos $\beta$
 BC = B sin $\phi_3$/cos (arc tan AB sin $\beta$/sin $\phi_3$)
 $\alpha$ = said turning angle
 $\beta$ = said caster angle $$\gamma = \arcsin\{\frac{B\sin\phi_2 + \{(BC\sin(\alpha+\omega)-BC\sin\omega)\tan\beta\cos\}\cos\beta}{B\cos(\alpha\cos\beta)} + \frac{\{(BC\cos\omega-BC\cos(\alpha+\omega))\sin(\frac{\phi_1}{\cos\beta})\}\cos\beta}{B\cos(\alpha\cos\beta)}\}$$

$\phi_1$ = king pin angle
 $\phi_2$ = camber angle
 $\phi_3$ = 90 − $\phi_1$ − $\phi_2$
 $\psi$ = tire position angle
 $\omega$ = arc sin (sin $\phi_2$ sin $\beta$)
 $\theta$ = maximum oscillation angle
 D = Oscillation axis offset distance.

24. The improvement as claimed in claim 23 wherein said pair of steerable wheel assemblies are driven with said pair of ground engaging drive wheels.

25. An off-road vehicle having a fore and aft extending body with one end carried by a transversely extending axle member having king pin means at opposite ends with each pivotally connected to a wheel assembly having a driven ground engaging steerable wheel spaced laterally outwardly from said fore and aft extending body, means acting on the wheel assembly for steering and turning said vehicle at a predetermined minimum turn radius, the improvement comprising: said king pin means having a caster angle in a range from 11° to 30° for tilting the wheels and causing the top portion of the inside turn wheel to lean outwardly from the body when the vehicle is turned at the minimum turn radius.

26. The improvement as claimed in claim 25 wherein said caster angle is 13°.

27. The improvement as claimed in claim 26 wherein said caster angle is in a range of from 11° to 20°.

28. The improvement as claimed in claim 27 wherein said caster angle is in a range from 13° to 16°.

29. An off-road vehicle having a fore and aft extending body with one end carried by a transverse axle member oscillatable from a horizontal position around a fore and aft extending axis, said transverse axle member having a king pin at opposite ends with each pivotally connected to a wheel assembly having a driven ground-engaging steerable wheel spaced laterally outwardly from said fore and aft extending body, means acting on the wheel assembly for steering and turning said vehicle at a predetermined minimum turn radius, the improvement comprising: said king pins having a caster angle in a range from 11° to 30° for tilting the wheels and causing the top portion of the inside turn wheel to lean outwardly from the body when the vehicle is turned at the minimum turn radius.

30. The improvement as claimed in claim 29 wherein said caster angle is 13°.

31. The improvement as claimed in claim 29 wherein said caster angle is in a range from 11° to 20°.

32. The improvement as claimed in claim 31 wherein said caster angle is in a range from 13° to 16°.

33. An off-road vehicle having a fore and aft extending body with one end carried by a transverse axle member oscillatable from a horizontal position around a fore and aft extending axis vertically displaced from said transverse axle member, said transverse axle member having a king pin at opposite ends with each pivotally connected to a wheel assembly having a driven ground engaging steerable wheel spaced laterally outwardly from said fore and aft extending body, means acting on the wheel assembly for steering and turning said vehicle at a predetermined minimum turn radius, the improvement comprising: said king pins having a caster angle in a range from 11° to 30° for tilting the wheels and causing the top portion of the inside turn wheel to lean outwardly from the body when the vehicle is turned at the minimum turn radius.

34. The improvement as claimed in claim 33 wherein said caster angle is 13°.

35. The improvement as claimed in claim 33 wherein said caster angle is in a range from 11° to 20°.

36. The improvement as claimed in claim 35 wherein said caster angle is in a range from 13° to 16°.

* * * * *

UNITED STATES PATENT AND TRADEMARK OFFICE
CERTIFICATE OF CORRECTION

PATENT NO. : 4,225,151

DATED : September 30, 1980

INVENTOR(S) : Mark A. Taute; Richard Treichel; Jeffrey C. Marks; Timothy J. Mattson It is certified that error appears in the above—identified patent and that said Letters Patent is hereby corrected as shown below:

Column 2, line 26, delete "tthe" and insert -- the --.

Column 7, lines 36 and 38, delete "8" and insert -- 12 --.

Column 9, line 53, delete "$\psi$" and insert -- $\omega$ --.

Signed and Sealed this

Twenty-third Day of March 1982

[SEAL]

Attest:

GERALD J. MOSSINGHOFF

Attesting Officer     Commissioner of Patents and Trademarks